(12) United States Patent
Zampelli

(10) Patent No.: US 8,167,263 B1
(45) Date of Patent: May 1, 2012

(54) MAGNETICALLY PLACEABLE STRAP

(76) Inventor: Nathan G. Zampelli, Akron, OH (US)

( * ) Notice: Subject to any disclaimer, the term of this patent is extended or adjusted under 35 U.S.C. 154(b) by 0 days.

(21) Appl. No.: 12/909,201

(22) Filed: Oct. 21, 2010

(51) Int. Cl.
*A47G 29/00* (2006.01)

(52) U.S. Cl. ............. 248/683; 248/690; 248/206.5; 410/116; 24/303; 24/300

(58) Field of Classification Search ........... 248/683, 248/206.5, 466, 500, 503, 510, 690, 692; D12/412, 414.1, 414; D6/538; 24/300, 301, 24/303; 410/96, 97, 106, 116; 135/119, 135/120.1, 120.2, 120.3, 120.4
See application file for complete search history.

(56) References Cited

U.S. PATENT DOCUMENTS

| | | | | | |
|---|---|---|---|---|---|
| 1,638,322 | A | * | 8/1927 | Chapman | 335/241 |
| 3,825,092 | A | * | 7/1974 | Graydon et al. | 180/272 |
| 3,992,938 | A | * | 11/1976 | Miller | 73/163 |
| 4,373,287 | A | * | 2/1983 | Grahl | 43/17 |
| 4,685,240 | A | * | 8/1987 | Fralick | 43/17 |
| 5,074,072 | A | * | 12/1991 | Serocki et al. | 43/17 |
| 5,163,243 | A | * | 11/1992 | Wold et al. | 43/17 |
| 5,520,031 | A | * | 5/1996 | Davidge | 70/18 |
| 5,800,106 | A | * | 9/1998 | Miller | 410/117 |
| 6,045,076 | A | * | 4/2000 | Daniels | 242/287 |
| 6,273,654 | B1 | * | 8/2001 | Whitaker | 410/116 |
| 6,524,041 | B1 | * | 2/2003 | Voiculescu | 410/100 |
| D480,946 | S | * | 10/2003 | Estep, Jr. | D8/367 |
| 6,732,986 | B2 | * | 5/2004 | Heidrich | 248/206.5 |
| 6,857,809 | B2 | * | 2/2005 | Granata | 403/121 |
| 7,097,144 | B2 | * | 8/2006 | Kohno | 248/206.5 |
| 7,306,190 | B2 | * | 12/2007 | Tisol, Jr. | 248/206.5 |
| 2010/0024175 | A1 | * | 2/2010 | Cserpes | 24/303 |
| 2010/0289288 | A1 | * | 11/2010 | Smith et al. | 296/35.1 |
| 2011/0214260 | A1 | * | 9/2011 | Wang | 24/303 |

* cited by examiner

*Primary Examiner* — Terrell McKinnon
*Assistant Examiner* — Eret McNichols
(74) *Attorney, Agent, or Firm* — Renner, Kenner, Greive, Bobak, Taylor & Weber

(57) ABSTRACT

A magnetically placeable strap, particularly adapted for use in pickup trucks having beds or panels of a ferrous content. The magnetically placeable strap includes a spool-like base having an elastic strap extending therefrom with a hook at an end of the strap. The base consists of a pair of parallel spaced apart disks, a bottom disk being cup-shaped and receiving a magnet therein. The top disk is provided with a plurality of kidney-shaped apertures for receipt of the hook at the end of the elastic strap, or for a user's fingers or tool that might be used in releasing the magnetic base from attachment to a ferrous surface. The magnetically placeable straps may be used singularly or in combination to secure any of various items in the bed of a pickup truck or the like.

6 Claims, 2 Drawing Sheets

MAGNETICALLY PLACEABLE STRAP

TECHNICAL FIELD

The invention herein resides in the art of securing devices and, more particularly, to straps of various types. More particularly, the invention relates to a strap secured to a magnetic base that is easily placed upon or removed from metallic surfaces, such as the beds of pickup trucks and the like. Specifically, the invention relates to an elastic strap fixed at one end to a magnetic securing element, and having a hook or similar attachment at the other.

BACKGROUND OF THE INVENTION

The use of pickup trucks, box vans and the like for transporting cargo of various types is now well known and practiced. Often, the cargo includes tools, fuel containers, work boxes, and a broad range of other devices and implements of various geometric sizes and configurations. It is typically desired that cargo of this nature be secured in the pickup truck or box van bed to prevent damage, spillage, unwanted noise, and the like. To this end, truck beds are often provided with eyelets, anchors, or other securements to which ropes, ratchet straps, elastic bands, and the like may be attached for securing the cargo. However, the eyelets, anchors and the like of such trucks are typically of a fixed nature, and are not given to a range of cargo sizes, configurations, and placements.

There is a need in the art for adaptable securement devices for implementation and use in association with truck beds, which accommodate cargo of various sizes, shapes, positions, and the like. Indeed, there is a need in the art for a selectively positionable securing strap mechanism for implementation and use in pickup truck and box van beds.

DISCLOSURE OF INVENTION

In light of the foregoing, it is a first aspect of an embodiment of the invention to provide a selectively positionable elastic strap for use in pickup truck beds.

It is another aspect of an embodiment of the invention to provide such a strap, which is magnetically placeable on any flat metallic surface of the pickup truck bed.

Still a further aspect of an embodiment of the invention is the provision of a magnetically placeable strap for us in pickup truck beds, in which a magnetic base provides significant holding power, sufficient to secure tools, fuel cans, work boxes and the like.

Yet a further aspect of an embodiment of the invention is the provision of a magnetically placeable strap, in which an elastic strap extends from a metallic base, the elastic strap having a hook or other securement device at an end thereof.

Yet another aspect of an embodiment of the invention is the provision of a magnetically placeable strap, which is of adjustable length.

Still a further aspect of an embodiment of the invention is the provision of a magnetically placeable strap having a magnetic base securing a first end of an elastic strap, and apertures within the base for receiving a second end of the strap.

An additional aspect of an embodiment of the invention is the provision of a magnetically placeable strap, in which the base is configured for ease of gripping by a user, for separating the magnetic attachment of the base to the bed of a pickup truck.

Still a further aspect of an embodiment of the invention is the provision of a magnetically placeable strap, which is cost effective and reliable in use.

The foregoing and other aspects of embodiments of the invention that will become apparent as the detailed description proceeds are achieved by a magnetically placeable strap, comprising: a spool-shaped base; an elastic strap extending from said base, said strap secured to said base at a first end of said strap; and a hook secured to a second end of said strap.

Still further aspects of embodiments of the invention that will become apparent herein are attained by a magnetically placeable strap, comprising: a base comprising a top disk spaced from a parallel bottom disk by a tubular cylinder, said spaced relation accommodating gripping by a user's fingers; an elastic strap passing through a first side of said top disk and restrained on a second opposite side of said top disk; and a securing hook affixed to an end of said elastic strap

DESCRIPTION OF DRAWINGS

For a complete understanding of the various aspects of the embodiments of the invention, reference should be made to the following detailed description and accompanying drawings wherein.

DETAILED DESCRIPTION OF PREFERRED EMBODIMENTS

Figure 1:
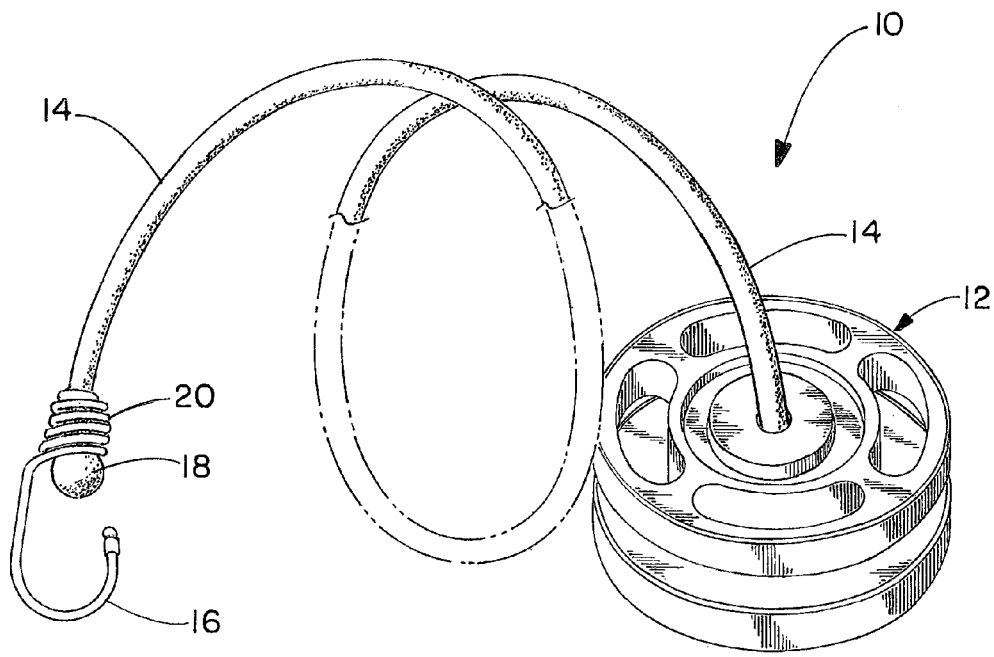
FIG. 1 is a perspective view of the magnetically positionable strap of the invention.

Referring now to the drawings, and more particularly FIG. 1, it can be seen that a magnetically placeable strap made in accordance with an embodiment of the invention is designated generally by the numeral 10. The magnetically placeable strap 10 includes a base member 12, generally spool-shaped in nature, with an elastic strap 14 extending therefrom. As will become apparent later herein, the elastic strap 14 is secured to the base 12 by means of an knot or other enlargement at a first end of the strap 14. At the opposite end of the strap 14, a hook 16 is provided. The hook 16 is retained at the end of the strap 14 by means of a spirally wound collar 20 formed as an end of the hook 16, and wrapped about a knot 18 or otherwise enlarged portion of the strap 14. According to an embodiment of the invention, the end of the strap 14 may simply be overlapped upon itself and crimped by an appropriate retainer to provide such an enlarged portion. Accordingly, the basic components of an embodiment of the invention include a spool-shaped base 12 having an elastic strap 14 extending therefrom, the elastic strap 14 having a hook 16 secured to an end thereof.

Figure 2:
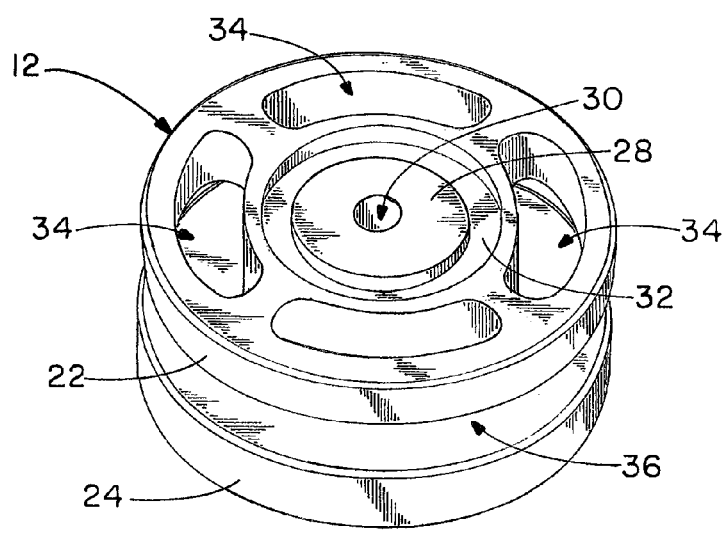
FIG. 2 is a perspective view of the base element of an embodiment of the invention.
Figure 3:
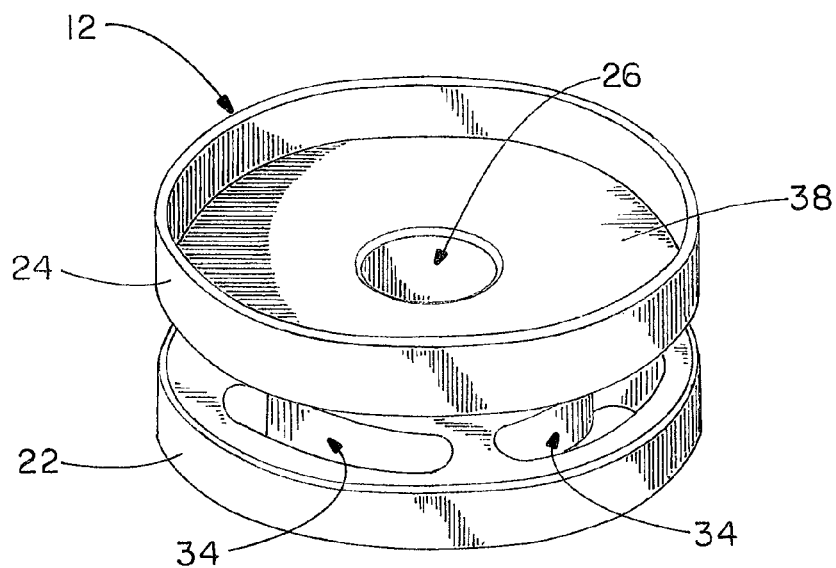
FIG. 3 is a perspective view of the base member of FIG. 2, viewed from the bottom thereof.
Figure 4:
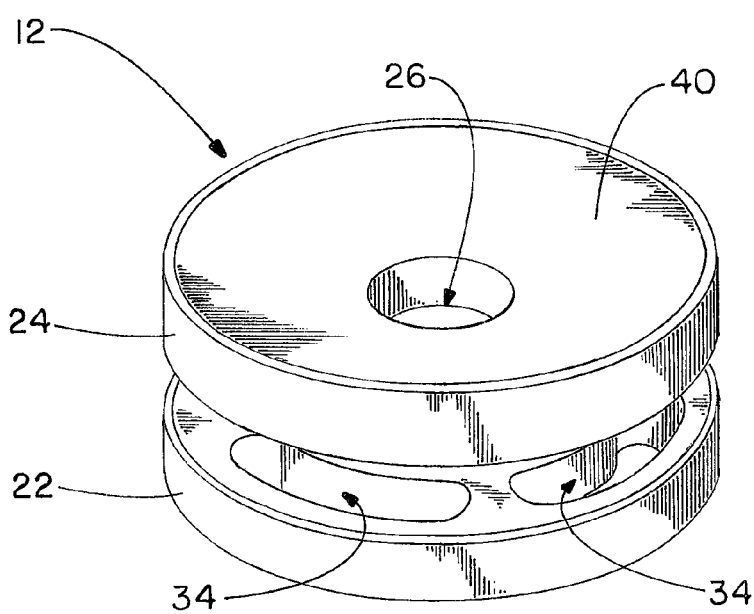
FIG. 4 is a perspective view of the base member as shown in FIG. 3, with a permanent magnet in place.

As best shown in FIG. 2, the base 12 comprises a top disk 22 and a bottom annular disk 24, the disks being parallel to each other and spaced apart by an interconnecting tubular cylinder 26, best shown in FIGS. 3 and 4. In a preferred embodiment of the invention, the base 12 is integrally formed of aluminum or the like, although it could be equally molded of high impact plastic. According to a preferred embodiment of the invention, the tubular cylinder 26 has an internal diameter on the order 0.75-1.0 inch, and preferably 0.875 inch. The cylinder also has a wall thickness on the order of approximately 0.25 inch.

The top disk 22 is provided with an annular top cap 28 that is fixedly positioned over a top end of the tubular cylinder 26. A circular aperture 30 passes through the top cap 28 and communicates with the interior of the tubular cylinder 26. Circular aperture 30 may be of any appropriate size to receive the elastic strap 14, but is preferably on the order of 0.25-0.5 inch, and most preferably 0.375 inch. A recess 32 encircles the annular top cap 28.

Also provided as part and parcel of the top disk 22 are a plurality of kidney-shaped apertures, uniformly circumferentially spaced thereabout. These apertures 34 are spaced between the outside circumference of the top disk 22 and the outer edge formed by the recess 32, as best shown in FIG. 2. These kidney-shaped apertures 34 preferably have a width on the order of 0.375-0.875 inch, and most preferably 0.5 inch. Each extends through an arc of 60-85°, and most preferably 75°.

As shown in FIGS. 2-4, a gap 34 is provided between the top disk 22 and bottom annular disk 24. The gap 36 is of sufficient size to accommodate the insertion of adult fingers and, in that regard, typically defines a spacing between the disks on the order of approximately 0.5 inch.

With reference now to FIG. 3, it can be seen that the bottom annular disk 24 is generally cup-shaped, the cup having a diameter of approximately 3.25 inch, with the top disk 22 and bottom annular disk 24 having diameters on the order of 3.5 inch. The cup 38 has a depth of approximately 0.375 inch, defining a receptacle sufficient to receive and maintain an appropriate magnet 40. The magnet 40 may be secured in the cup 38 by means of an appropriate permanent adhesive bolt, or the like. Alternatively, if the base 12 is manufactured from a material having a ferrous content, the magnet may simply be magnetically retained.

According to certain embodiments of the invention, the elastic strap 14 may be provided with a knot or otherwise enlarged end that is received within the tubular cylinder 26, and of such size as to prevent its passage through the circular aperture 30. According to another embodiment of the invention, the hook 16 may be selectively engageable along the entire length of the elastic strap 14, to provide for an adaptive strap to accommodate various uses. It will be appreciated that the kidney-shaped apertures 34 serve multiple purposes, including finger grips for the user, who may remove the base 12 from its magnetically secured position upon a surface by inserting fingers into the gap 36, with the tips thereof being received by the apertures 34. Similarly, a tool such as a small screwdriver or pry bar, may be inserted into the apertures 34 to assist in disengaging the base 12 from its magnetically secured engagement to a ferrous surface. The apertures 34 also provide securing regions for the hook 16.

In use, in a pickup truck or the like, having a bed or side panels of ferrous metal construction, the base 12 may be placed at any location where securement of an article might be desired. With the magnet 40 in engagement with a bed or panel, the elastic strap 14 may be pulled about any device that is desired to be secured in the pickup truck bed. Such devices might include fuel cans, hand tools, toolboxes and the like. With the strap 14 wrapped about the implement, and with the hook 16 received in and secured to an aperture 34, the implement or device may be secured in the location where the base 12 has been positioned. Of course, it is desired that the elastic strap be stretched or loaded during the securing operation, such that the attachment is reliable. The implementation of a hook 16 adjustably positionable upon the strap 14 may assist in this regard.

The invention also contemplates that several magnetically placeable straps 10 may be used in a bed of a pickup truck to secure larger items, with the strap 14 of one device 10 extending to and being secured by an aperture 34 of another device 10.

It will be readily appreciated that, in implementation, the magnetically placeable straps 10 may be positioned at any of various places in a pickup truck bed, or in any other device desired, to secure items and implements of various sizes, shapes, configurations, and the like. Indeed, while the invention has been specifically described in the context of use in pickup trucks and box vans, it is useful in any of an array of buildings, structures, vehicles and the like where it is desired to secure items.

Thus it can be seen that the various aspects of different embodiments of the invention have been attained by the structures presented and discussed above. While in accordance with the patent statutes only the best mode and preferred embodiments of the invention have been presented and described in detail, the invention is not limited thereto or thereby. Accordingly, for an appreciation of the true scope of the invention, reference should be made to the following claims.

What is claimed is:

1. A magnetically placeable strap, comprising:
   a spool-shaped base comprising a top disk and a bottom annular disk, said top disk and bottom annular disk being parallel and spaced apart by a tubular cylinder;
   an elastic strap extending from said base, said strap secured to said base at a first end of said strap, and wherein said top disk has a central aperture through which said elastic strap passes, said strap being enlarged at said first end thereof, precluding movement of said first end through said central aperture;
   a hook secured to a second end of said strap;
   wherein said top disk is characterized by a plurality of circumferentially spaced apertures passing therethrough for selective receipt of said hook;
   wherein said bottom annular disk is a cup-shaped recess, said cup shaped recess opening in a direction opposite that of said top disk; and
   a magnetic disk received within said cup-shaped recess of said bottom annular disk.

2. The magnetically placeable strap according to claim 1, wherein said strap is of adjustable length.

3. The magnetically placeable strap according to claim 1, wherein said top and bottom disks are spaced apart, providing a gap therebetween accommodating insertion of fingers.

4. A magnetically placeable strap, comprising:
   a base comprising a top disk spaced from a parallel bottom disk by a tubular cylinder, said spaced relation accommodating gripping by a user's fingers;
   an single elastic strap passing through a first side of said top disk and restrained on a second opposite side of said top disk;
   a single securing hook affixed to an end of said elastic strap;
   wherein said top disk has a plurality of circumferentially, spaced apertures passing therethrough to accommodate receipt of said hook in securing engagement;
   wherein said bottom disk is a cup-shaped recess, said cup shaped recess opening in a direction opposite that of said top disk; and
   a magnetic disk received within said cup-shaped recess of said bottom disk.

5. The magnetically placeable strap according to claim 4, wherein said top disk has a central aperture passing therethrough, said strap passing through said 3 central aperture.

6. The magnetically placeable strap according to claim 4, wherein said circumferentially spaced apertures accommodate receipt of finger tips of a user to facilitate removal of said base from an attached surface.

* * * * *